United States Patent [19]
Trostmann et al.

[11] 3,890,839
[45] June 24, 1975

[54] APPARATUS FOR MEASURING A FLUID FLOW RATE

[75] Inventors: Erik Trostmann, Birkerod; Jens Andreas Toft Fensvig, Lyngby, both of Denmark

[73] Assignee: Instituttet for Produktudvikling, Lyngby, Denmark

[22] Filed: July 20, 1973

[21] Appl. No.: 381,138

[30] Foreign Application Priority Data
July 25, 1972 Denmark .......................... 3676/72

[52] U.S. Cl. .................................. 73/199; 73/261
[51] Int. Cl. ............................................ G01f 1/00
[58] Field of Search ............ 73/199, 232, 253, 254, 73/261, 398 C

[56] References Cited
UNITED STATES PATENTS
| | | | |
|---|---|---|---|
| 2,079,083 | 5/1973 | Montelius | 73/261 |
| 3,004,429 | 10/1961 | Granan et al. | 73/232 |
| 3,583,220 | 6/1971 | Kawakami | 73/205 R |
| 3,633,420 | 1/1972 | Holzem | 73/199 |

*Primary Examiner*—Charles A. Ruehl
*Attorney, Agent, or Firm*—Sughrue, Rothwell, Mion, Zinn & Macpeak

[57] ABSTRACT

An apparatus for measuring the flow rate of fluid comprises a DC unit coupled in parallel with an AC unit. The DC unit is a positive displacement screw rotor machine driven by a motor, the rotational speed of which is controlled by a signal derived from the AC unit, which unit comprises a cylinder and a piston axially movable therein. The position or velocity of the piston determines the output signal of the AC unit, which thus is representative of the AC component of the fluid flow, while the instantaneous rotational speed of the rotor of the DC unit is representative of the DC flow component. A filter may be included in the line which transmits the control signal from the AC unit to the drive motor in order to filter out frequencies above a predetermined value from the control signal.

14 Claims, 8 Drawing Figures

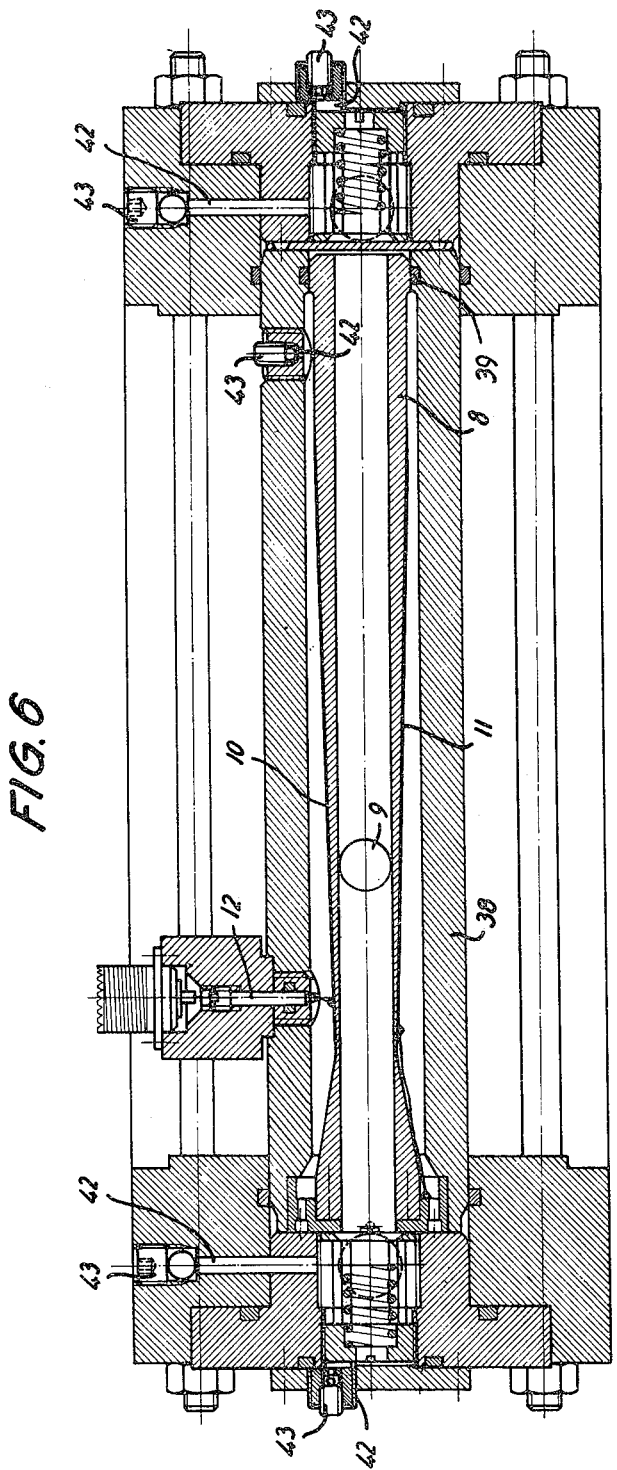

APPARATUS FOR MEASURING A FLUID FLOW RATE

BACKGROUND OF THE INVENTION

The present invention relates to apparatus for measuring fluid flow rate. It comprises a positive displacement device having a stator provided with fluid inlet and outlet means and a rotor operating as a fluid displacer within the stator, a variable speed drive motor for the rotor, control means for adjusting the rotor speed dependent upon the pressure difference between the fluid inlet and outlet means, and means for indicating the rotational speed of the rotor.

In the present context, the term "positive displacement device" means a device or machine in which the displacer rotor forms one or more separating surfaces the movement of which relative to the stator causes or is caused by the fluid flow — as the case may be — in such a way that — disregarding inaccuracies due to leakage, entrainment of fluid by viscous pumping, or other deviations from the idealized theoretical operating conditions — in any angular position there exists a unique correlation between the instantaneous speed at which the separating surface moves and the instantaneous flow rate of the fluid.

From published German patent application No. 2,049,770 there is known an apparatus of the kind referred to in which the positive displacement device is formed as a Roots blower, the rotational speed of which can be adjusted to a value such that the difference between the fluid pressures at the inlet and outlet is at least approximately zero. This feature reduces the measuring error, which is due to the leak flow through the gap between the stator and the rotors of the apparatus. From U.S. Pat. No. 2,621,516 there is known another apparatus of the kind in question in which the positive displacement device is a vane or wing pump and in which the pressure difference between the inlet and outlet is measured by means of a diaphragm.

SUMMARY OF THE INVENTION

According to the invention, there is provided an apparatus for measuring a fluid flow rate comprising in combination:

A DC flow measuring unit in the form of a positive displacement screw rotor device having a stator with a fluid inlet and a fluid outlet, a displacer screw rotor rotatably supported in said stator, and a variable speed drive motor for said rotor, an AC flow measuring unit in the form of a cylinder connected between said fluid inlet and outlet in parallel with said DC measuring unit, a piston-like body freely movable within said cylinder in the longitudinal direction thereof, means for measuring the longitudinal position or instantaneous velocity of the piston-like body relative to the cylinder, means responsive to an output signal of said measuring means for controlling the rotational speed of said screw rotor, and means for indicating the rotational speed of said screw rotor.

An apparatus according to the invention has the advantage over the known apparatuses discussed above that its measuring accuracy is greater even when relative large pulsations occur in the fluid flow to be measured. The screw rotor device has the advantage that when the rotor revolves at a constant angular velocity, the instantaneous flow rate of the fluid through the device is substantially constant since it does not vary with the angular position of the rotor. The screw rotor device has the further advantage that the relative motion between its rotor and stator in the contact surface between these members is perpendicular to the general flow direction so that entrainment of fluid through the gap between rotor and stator as a result of the so-called viscous pumping is substantially reduced or eliminated. Viscous pumping causes a measuring error which depends upon the viscosity and mass density of the fluid, the fluid pressure and the rotor speed, and which often amounts to 2–3 percent of the displacement volume of the machine so that the error may be as great as the leak flow mentioned above. Theoretically it might be possible to effect a correction for the error due to viscous pumping, but since the error depends upon a plurality of factors, it is hardly possible in practice to effect the correction, and at any event it is of great practical value that the viscous pumping can be reduced to a negligible amount.

The control means for the rotor speed comprising the cylinder and the piston-like body movable therein can be adapted to accommodate rather large pulsations in the fluid flow, which is being measured and by an appropriate filtering of the output signal from the measuring means it is possible to keep the pulsations away from the drive motor, which thus can be used for indicating the average or DC value of the flow while the pulsations or AC component of the flow can be indicated by the signal from the piston-like body. The apparatus may for instance be used to record frequency characteristics for an electro-hydraulic servo valve, i.e. the relation between the electric actuating current and the fluid flow through the valve, whereby the phase and the amplitude of the output signal from the measuring cylinder can be compared to the corresponding parameters of the actuating current.

A measuring apparatus according to the invention delivers measurements which are both reproducible and exact; i.e., they do not require any subsequent corrections based upon tables, nomographs, or the like. The apparatus is capable of resolving the fluid flow into a DC component and an AC component and of recording each component separately, if desired.

The piston-like body may be a ball movable with a close fit in the cylinder, which feature reduces the friction against the movement of the body, inter alia, because the shape of the gap between the ball and the cylinder wall promotes a hydrodynamic lubrication. The reduced friction results in a corresponding reduction of a factor of uncertainty in the measuring result.

The ball may have substantially the same specific gravity as the fluid, whereby an undesirable pressure differential across the gap between the ball and the cylinder due to mass forces is eliminated.

The ball may be made of or at least be coated with an electrically conductive material, while the cylinder may be made of an electrically insulating material. The means for measuring the position of the ball may comprise two capacitor plates electrically insulated from one another and from the ball, which plates extend in the longitudinal direction of the cylinder substantially diametrically opposed to each other and with a mutual distance that diminishes from the one end of the cylinder towards the opposite end, and a converter for delivering an electric output signal depending upon the capacitance of the capacitor formed by the plates and the ball. An electric output signal is thus obtained which has a one-to-one relationship with the axial position of the ball in the cylinder.

The cylinder may have a decreasing wall thickness from one end towards its opposite end, and in this case the plates can be mounted on the outer surface of the cylinder and have a decreasing width from their central region towards either end. The variable distance between the capacitor plates is thus brought about in a simple manner compared with, for instance, embedding the plates in the cylinder walls. By suitably dimensioning the widths of the plates, it is possible to achieve a rather exact linear correlation between the position of the ball and the capacitance measured.

The cylinder may be surrounded by an outer protective tube which, in conjunction with the cylinder, forms an annular chamber which is fluid-tight sealed at the end where the wall-thickness of the cylinder is at its maximum and which, at the opposite end, communicates with the inner space of the cylinder. It is then possible to make the wall-thickness of the cylinder very low at the thin end and hence obtain a maximum capacitance between the capacitor plates because the surrounding chamber relieves the cylinder wall of forces due to the fluid pressure. The fact that the annular chamber communicates with the interior of the cylinder at the thin end thereof ensures that the relief is also effective when sudden pressure changes occur in the fluid flow.

Additional features and advantages of the invention will appear from the following description of an embodiment of the measuring apparatus according to the invention and its employment for recording the characteristics of an electrohydraulic servo valve.

BRIEF DESCRIPTION OF THE DRAWINGS

FIG. 6 is a section taken along line VI—VI in FIG. 5.

DETAILED DESCRIPTION

Figure 1:
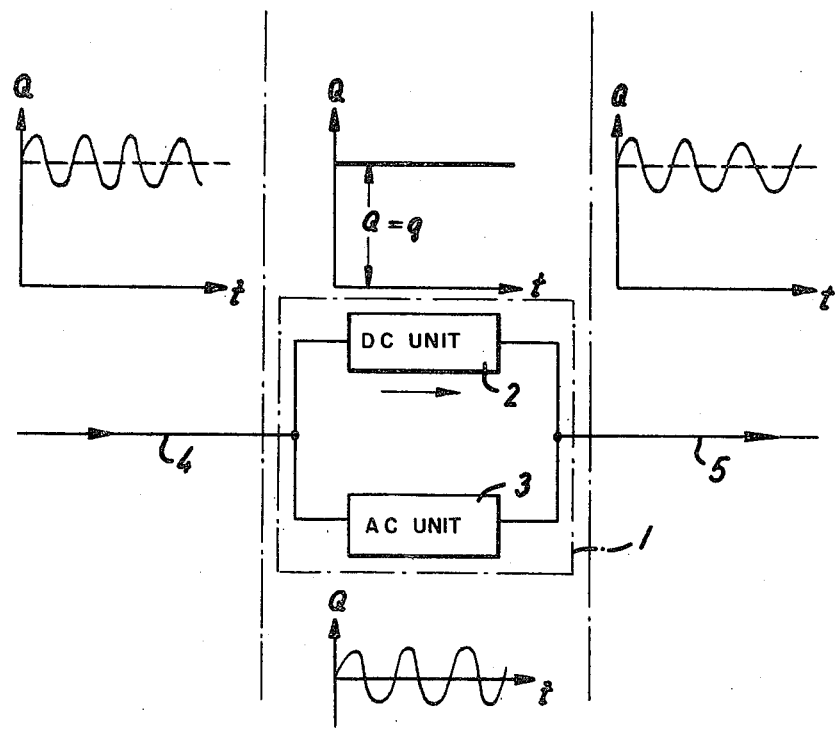
FIG. 1 is a diagram illustrating the principle of the mode of operation of the apparatus.

The measuring apparatus shown in the drawings and generally designated by 1 is composed of a unit 2 adapted to measure the DC component of a fluid flow passing through the apparatus and a unit 3 coupled in parallel therewith for measuring the AC component of the flow. The flow of fluid enters the measuring apparatus via an inlet 4 and passes out of the apparatus via an outlet 5.

Besides the mentioned parts of the measuring apparatus, FIG. 1 shows curves illustrating the flow rate as a function of the time, in inlet 4, in the measuring apparatus 1 and in outlet 5, respectively. In the inlet and the outlet, the velocity of the flow, which in all the curves is designated by Q, is pulsating and it can be regarded as being composed of a stationary or quasistationary flow rate q which constitutes the DC component of the fluid flow and an AC component pulsating around zero. By controlling the DC unit 2 of the apparatus from a measuring signal derived from AC unit 3, a constant or stationary flow rate q is achieved in the DC unit while the AC component of the original fluid flow occurs solely in the AC unit 3.

Figure 2A:
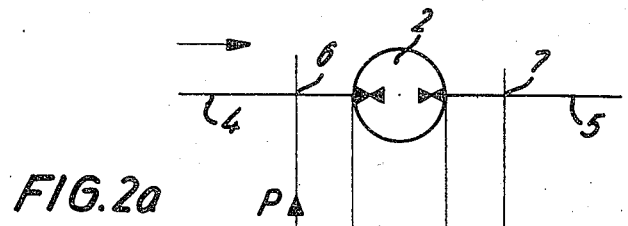
FIGS. 2a, 2b and 2c are diagrams illustrating the principle of the function of that part of the apparatus which measures the DC component of the fluid flow rate.
Figure 2B:
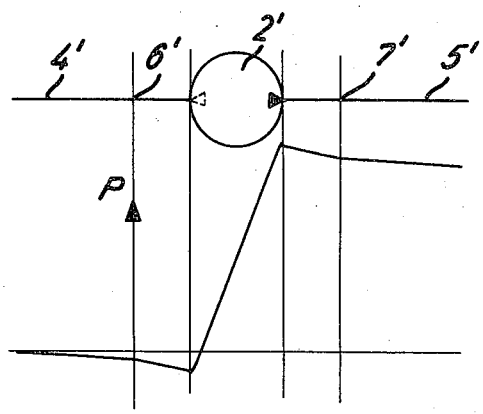
Figure 2C:
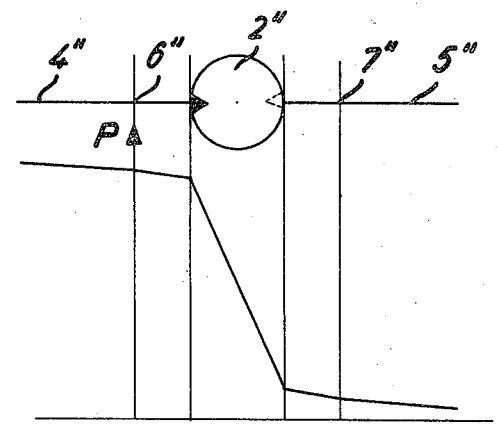

The basic principle behind the construction of the DC unit 2 appears from FIGS. 2a, 2b and 2c. FIG. 2a shows the unit 2 with its inlet 4 and outlet 5 as well as the fluid pressure P in the unit and in the connected conduits. With the direction of fluid flow marked by an arrow, there will be a pressure drop in conduits 4 and 5, but in unit 2 proper (or, to be more exact, between two suitably selected points 6 and 7 located downstream and upstream of the displacer of the unit, respectively) a constant pressure has to be maintained in the fluid. As is known, such a control of unit 2 results in that the flow in conduits 4 and 5 is not influenced by the presence of unit 2 or - in other words - it takes place as if the conduits 4 and 5 were directly connected to each other in a coincident point 6, 7.

Unit 2 is a positive displacement device, that is to say, a volumetric machine which according to FIG. 2a is driven such that, between the aforementioned points 6 and 7, neither a rise nor a drop in pressure occurs in the fluid flowing through the unit. As distinct therefrom, FIG. 2b shows the pressure conditions when employing a corresponding volumetric machine 2' as a pump, whereby energy supplied from the drive motor of the machine is transmitted to the fluid flowing through so that its pressure increases as indicated by the associated pressure curve. FIG. 2c shows the corresponding conditions when employing a corresponding machine 2" as a motor, that is to say, that the fluid flowing through supplies energy to the machine, whereby its pressure drops.

In this connection it is remarked that FIG. 2a represents the idealized pressure conditions in the DC unit of the measuring apparatus and that minor pressure differences may occur in practice, for example, when the drive motor of the DC unit is controlled from the AC unit as described below. It will, however, be possible to tolerate such deviations as long as the leakage characteristics of the DC unit in case of positive and negative pressure differentials, respectively, between points 6 and 7, are so close to each other that the difference between the leak volumes in one and the other direction through the unit, during a given period, is below the tolerable inaccuracy relative to the measuring of the DC component of the fluid flow.

It will be realized that the drive motor of unit 2 has, at all times, to supply energy to the unit at a rate which is sufficient to compensate for the internal mechanical losses in the unit as well as for the - relatively far smaller - losses due to the friction of the fluid. Moreover, when the DC unit has the properties prescribed above, the instantaneous rpm. (or angular velocity) of the drivemotor of the unit will represent an analogous value of the fluid flow rate, and it will be seen that the measuring range of the unit is limited only by the limitations which apply to the rpm. of the drive motor.

Figure 3:
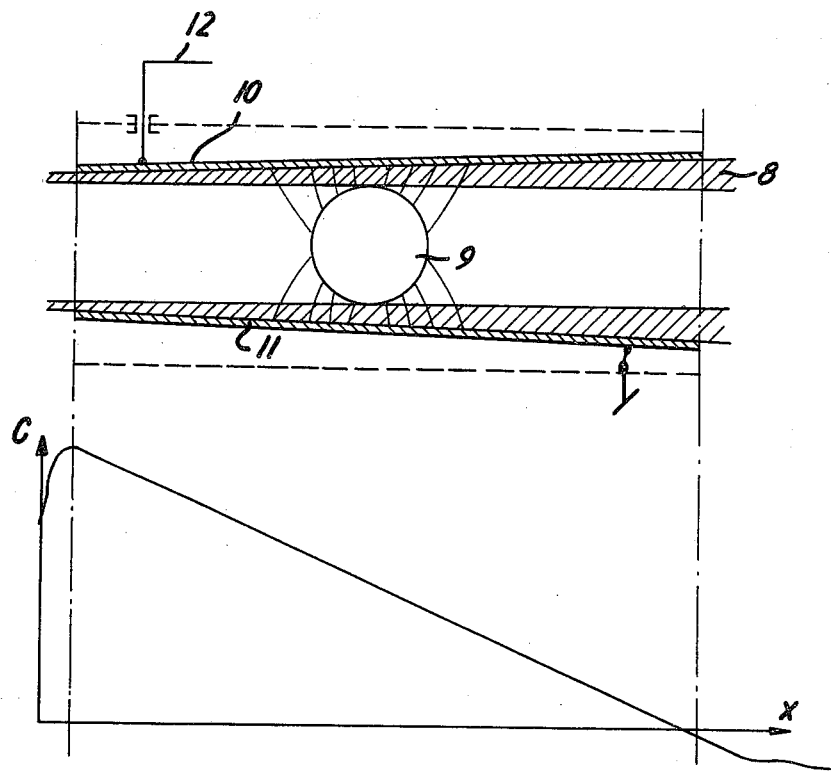
FIG. 3 is a diagram illustrating the principle of the function of that part of the apparatus which measures the AC component of the fluid flow rate and which, at the same time, controls the drive motor of the DC-measuring part.

FIG. 3 illustrates the principle of an embodiment of the AC unit 3 described in greater detail below. The unit comprises a cylinder 8 of electrically insulating material which has an exactly cylindrical internal surface, while externally it is slightly conical. A ball 9 which, at least on its surface, is electrically conductive, is displaceable with a close fit in cylinder 8 in such a way that the ball effects a reciprocating motion in the longitudinal direction of the cylinder in timed relationship with the AC component of the fluid flow occurring in unit 3, cf. FIG. 1. The ball may be fabricated from metal; however, it will preferably be fabricated from lighter material, e.g. plastics, and be merely coated with a conductive layer. If the weight of the ball corresponds to the weight of the volume of fluid which it displaces, then no pressure difference will be produced across the sealing gap between the ball and the inner wall of the cylinder due to mass forces having their origin in the acceleration of the ball during the reciprocating movement.

Two capacitor plates 10 and 11 of electrically conductive material are mounted on the outside of cylinder 8 diametrically or substantially diametrically opposite each other. A signal line 12 connected to plate 10 transmits a signal to a control unit for the measuring apparatus described in greater detail below, while plate 11, as indicated in FIG. 3, is connected to the frame of the apparatus. Plates 10 and 11, in conjunction with ball 9, form a capacitor whose capacitance, due to the varying distance between plates 10 and 11, varies with the axial position of the ball in the cylinder 8 and, by an expedient shaping of the two plates 10 and 11, it is possible to obtain a capacitance C of the capacitor which, as depicted in the curve of FIG. 3, varies linearly with the position of the ball. This can, for instance, be achieved by a generally cigar-shaped outline of the two plates with the greatest width of each plate located near the centre point of the measuring range.

While FIG. 3 shows a capacitive measuring of the position of ball 9 whose instantaneous velocity corresponds to the velocity of the AC component of the fluid flow, it would, of course, also be possible to utilize other measuring methods, preferably such methods in which no contact takes place between the ball and the measuring means, e.g. inductive or optical methods. If the output signal from the measuring unit shown in FIG. 3 is to be utilized for measuring the velocity of the AC component, the signal will have to be differentiated, which can be done in a known manner in an electric circuit. Additionally, the measuring signal may be utilized for controlling the DC unit in such a way that the mean value of the AC component is zero, cf. FIG. 1. That is to say, the measuring signal may be utilized for controlling the DC unit in such a way that the to and fro movement of ball 9 occurs to either side relative to a corresponding zero position in cylinder 8.

Figure 4:
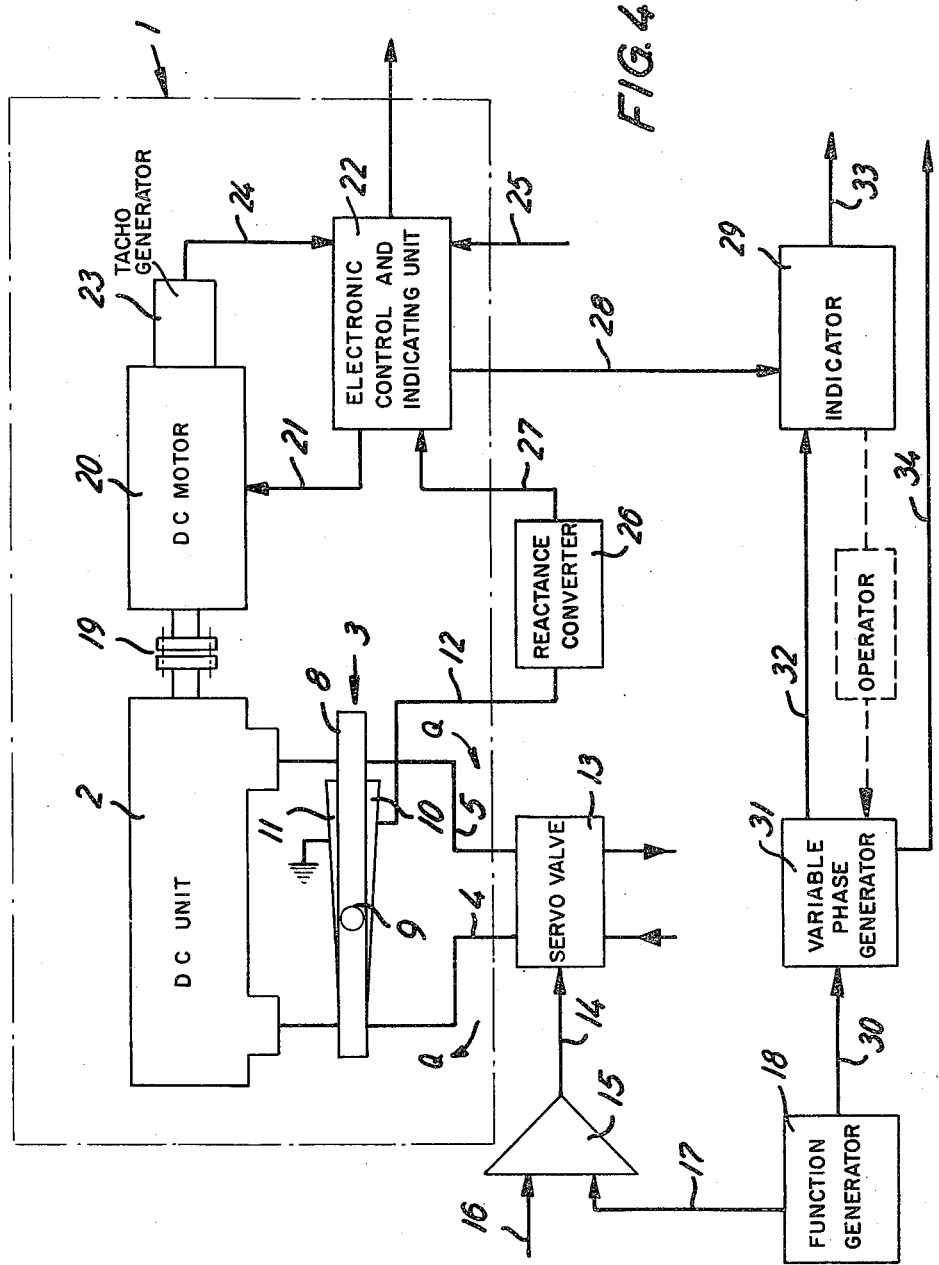
FIG. 4 is a block diagram of the apparatus with various additional components for recording the frequency characteristics of a servo valve.

FIG. 4 shows a block diagram for the control of the DC unit in connection with the recording of frequency characteristics of a hydraulic servo valve. The servo valve, which is designated by 13, is connected to the inlet and outlet conduit 4 and 5 of measuring apparatus 1. The control or actuating current of the valve is supplied via a power supply line 14 from an amplifier 15 which can be supplied with a constant DC current via a line 16 and additionally via a line 17 with an AC current generated in a function generator 18.

The DC unit 2 of the measuring apparatus is driven through a coupling 19 by a DC motor 20, whose rotational speed and direction of revolution are variable and which, via a supply line 21, is supplied from an electronic control unit 22. Motor 20 is coupled to a tacho generator 23 which supplies an output signal determined by the number of revolutions of the motor. Through line 24 this signal is fed to control unit 22. A reference voltage for motor 20 is supplied via a supply line 25.

Capacitor plate 10 of the AC unit is, via the previously mentioned line 12, connected to a reactance converter 26 which supplies an electric voltage proportional to the capacitance measured. Via a power supply line 27, this voltage is fed to control unit 22 and is utilized to control motor 20 in such a way that the number of revolutions of the motor are increased when the AC component of the fluid flow measured in unit 3 contains a "positive" DC component, that is to say, that the ball 9 as seen in FIG. 4 has a tendency of moving towards the right. Conversely, the number of revolutions of the drive motor 20 are reduced if ball 9 generally moves towards the left in cylinder 8, that is to say, that a "negative" DC component occurs in measuring unit 3 because the fluid flow rate in measuring unit 2 is too high. That part of electronic control unit 22 which produces the control voltage supplied via line 21 to motor 20 may be provided with a filter that filters off oscillations above a certain frequency from the signal supplied via line 27, so that a change in the number of revolutions of motor 20 is only effected when the mean position of ball 9 shows a tendency towards a permanent change.

However, for recording the previously mentioned frequency characteristics of servo valve 13, the direct output signal from converter 26 has to be employed since, as mentioned, the differentiated signal indicates the instantaneous velocity of ball 9, that is to say, the instantaneous velocity of the AC component of the fluid flow. The differentiated measuring signal is fed via line 28 to an indicator 29 in which it is compared with a signal supplied from function generator 18 via line 30, a variable phase generator 31 and line 32 so that it is possible, via an output line 33, to obtain a signal from indicator 29 which represents the ratio between the amplitudes of the control current of the servo valve and the fluid flow. Via a line 34, an output signal can be obtained which indicates the phase displacement between the AC components of the control current and the fluid flow.

If it is only desired to measure the DC component of the fluid flow, the drive motor of measuring unit 2 may alternatively be controlled in a simpler manner, i.e. by means of pressure sensors mounted in the inlet and in the outlet of the measuring apparatus coupled with means for adjusting the number of revolutions of the drive motor to such a value that the pressure differential becomes zero.

Figure 5:
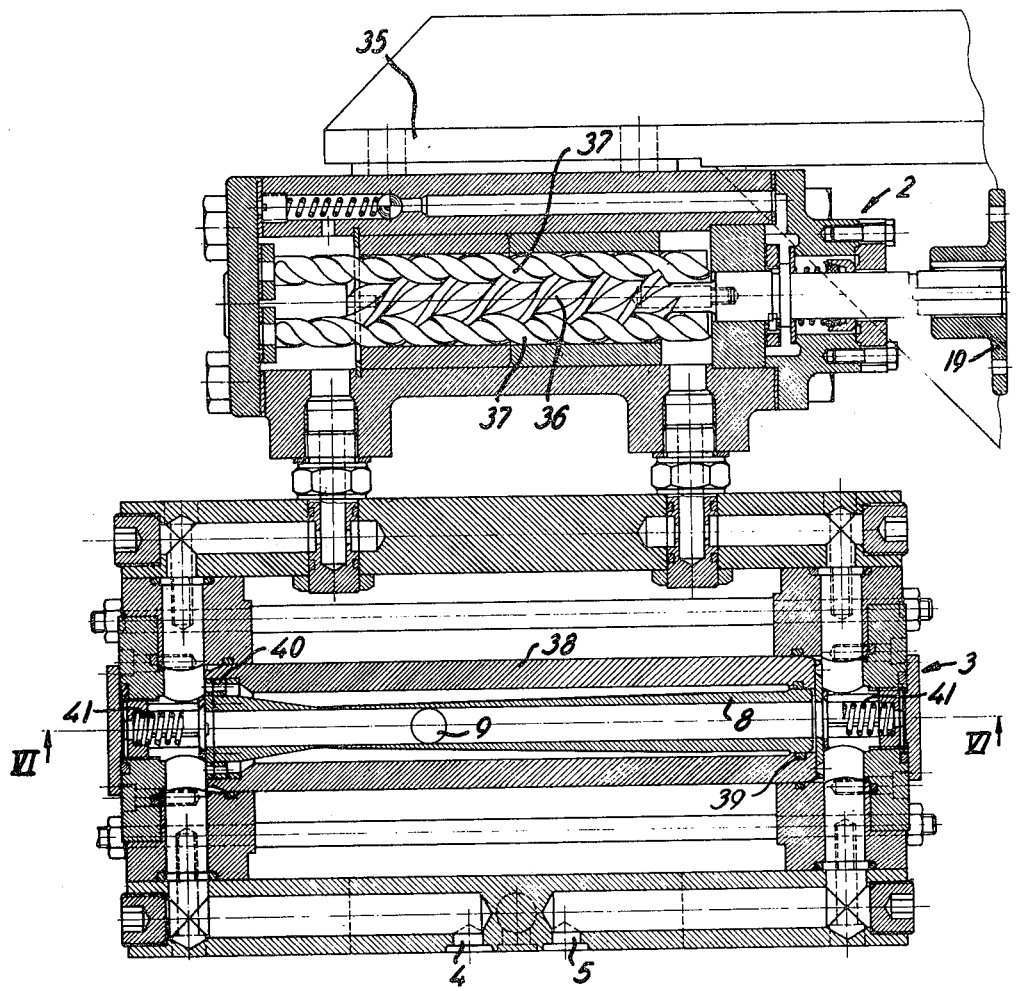
FIG. 5 is an elevational view, partly in section, of the measuring apparatus proper.

In FIG. 5, the two units 2 and 3 of the measuring apparatus are shown mounted on a common base 35, which also mounts drive motor 20 of DC unit 2 and the tacho generator 23 coupled thereto. Inlet 4 and outlet 5 communicate via internal ducts in the housings of the two measuring units, with the righthand and lefthand end, respectively, of cylinder 8 and with the inlet and outlet of unit 2. Unit 2 is a screw rotor machine having a displacer or main rotor 36 which, through coupling 19, is driven by motor 20, and two side or sealing rotors 37. In this known construction in which the rotors, together with the housing of the unit, form a number of mutually isolated fluid-filled chambers, the fluid flows in the direction from inlet 4 to outlet 5 when the main rotor 36 rotates clockwise as seen from the left-hand end of the rotor in FIG. 5, and the flow rate is proportional to the number of revolutions or angular velocity of rotor 36.

In order to achieve a maximum capacitance of the capacitor formed by the two capacitor plates (not shown in FIGS. 5 and 6) and ball 9, it is desirable that the minimum wall-thickness of the externally conical cylinder 8 be as small as possible. In order that the measuring unit may at the same time be employed at relatively high pressures, cylinder 8 is surrounded by an outer protective cylinder 38 having a comparatively large wall-thickness. Cylinder 38 is, at its right-hand end in FIGS. 5 and 6, sealed fluid-tight from the interior of cylinder 8 by means of a sealing ring. At its left-hand end, the cylinder 38 communicates with the inlet duct and hence with the interior of cylinder 8, via apertures 40 in an intermediate ring which, at the same time, centres the two cylinders relative to one another. The wall of cylinder 8 is thus relieved from radial stresses.

Outside the ends of cylinder 8, two helical compression springs 41 are fitted in the housing of unit 3. These springs serve to prevent the ball 9 from moving out of the cylinder, in which case the fluid would be able to flow direct from inlet 4 to outlet 5.

It will be appreciated that, if the direction of the measured flow of fluid changes, the functions of conduits 4 and 5 referred to as inlet and outlet will be reversed simultaneously with the direction of rotation of main rotor 36 being reversed, but this does not alter anything in the function of the apparatus. The ball 9, which is freely displaceable in cylinder 8, ensures in all cases that practically no pressure differentials occur between the ends of cylinder 8, so that the aforementioned pressure relief of the cylinder via apertures 40 is effective irrespective of the direction of flow of the fluid.

In FIG. 6, the connection of line 12 to the capacitor plate 10 is schematically indicated, and the figure also shows venting apertures 42 which, during operation of the apparatus, are sealed by screwed-in threaded plugs 43.

A by-pass passage may be provided between the inlet and the outlet of the measuring apparatus. The by-pass passage includes a normally closed relief valve that opens when a predetermined pressure differential is exceeded regardless of what its direction may be. This provides an additional safeguard against the exposure of the wall of measuring cylinder 8 to inadmissibly great pressure differentials. The opening pressure of the relief valve may be adjusted such that it is somewhat higher than the pressure which normally is required to displace ball 9. When the outer cylinder 38 is fabricated from steel or other electrically conductive material, it acts at the same time as an electric screen for the measuring capacitor.

While in the embodiment described in detail above, the rotational speed of the screw rotor is adjusted by a corresponding adjustment of the rotational speed of the motor, it may also be possible to employ a constant speed motor coupled to the screw rotor through a variable gear, in which case the output signal from the AC unit would serve for adjusting the ratio between the input and output speeds of the variable gear.

What we claim is:

1. An apparatus for measuring a fluid flow rate, said apparatus comprising:
   a. a positive displacement screw rotor device having a stator with a fluid inlet and a fluid outlet, a displacer screw rotor rotatably supported in said stator, and a variable speed drive motor for said rotor;
   b. a cylinder made of an electrically insulating material connected between said fluid inlet and said fluid outlet in parallel with said positive displacement screw rotor device;
   c. a piston-like body at least the surface of which is made of an electrically conductive material, said piston-like body being freely movable within said cylinder in the longitudinal direction thereof substantially without viscous friction between said piston-like body and the internal wall of said cylinder;
   d. two capacitor plates which are insulated from one another and from said piston-like body, said capacitor plates extending in the longitudinal direction of said cylinder substantially diametrically opposite each other with a distance between them which decreases from one end of said cylinder towards the opposite end thereof;
   e. a converter for supplying an electric output signal dependent upon the capacitance of the capacitor formed by said capacitor plates and said piston-like body;
   f. means responsive to said output signal for controlling the rotational speed of said screw rotor; and
   g. means for indicating the rotational speed of said screw rotor.

2. Apparatus as recited in claim 1 wherein said piston-like body is formed so as to contact said cylinder in a sealing fashion substantially only along a circumferentially extending line intermediate the ends of said piston-like body.

3. Apparatus as recited in claim 2 wherein said piston-like body is a ball movable with a close radial fit in said cylinder.

4. Apparatus as recited in claim 1 wherein the density of said piston-like body is substantially the same as the density of the fluid.

5. Apparatus as recited in claim 1, wherein the wall-thickness of said cylinder decreases from one end thereof towards the opposite end thereof and said capacitor plates are mounted on the outer surface of said cylinder.

6. Apparatus as recited in claim 5 and further comprising:
   a. an outer protective tube surrounding said cylinder and forming therewith an annular chamber;
   b. sealing means for closing that end of the annular chamber between said outer protective tube and said cylinder at which the wall-thickness of said cylinder is at its maximum; and
   c. means for connecting the interior of the annular chamber between said outer protective tube and said cylinder with the interior of said cylinder, said means being located at the end of the annular chamber at which the wall-thickness of said cylinder is at its minimum.

7. Apparatus as recited in claim 1 and further comprising:

a. an outer protective tube surrounding said cylinder and forming therewith an annular chamber;

b. sealing means for closing one end of the annular chamber between said outer protective tube and said cylinder; and c. means for connecting the other end of the annular chamber with the interior of said cylinder.

8. Apparatus as recited in claim 1 and further comprising a compression spring located axially outside each end of said cylinder and coaxially therewith for preventing said piston-like body from moving out of said cylinder.

9. An apparatus for measuring a fluid flow rate, said apparatus comprising:

a. a positive displacement screw rotor device having a stator with a fluid inlet and a fluid outlet, a displacer screw rotor rotatably supported in said stator, and a variable speed drive motor for said rotor;

b. a cylinder connected between said fluid inlet and said fluid outlet in parallel with said positive displacement screw rotor device;

c. a piston-like body freely movable within said cylinder in the longitudinal direction thereof substantially without viscous friction between said piston-like body and the internal wall of said cylinder;

d. measuring means for measuring a parameter related to the movement of said piston-like body within said cylinder;

e. means for indicating the instantaneous linear speed of said piston-like body within said cylinder;

f. means responsive to an output signal of said measuring means for controlling the rotational speed of said screw rotor; and g. means for indicating the rotational speed of said screw rotor.

10. Apparatus as recited in claim 9 wherein the parameter measured by the element recited in subparagraph (d) is the longitudinal position of said piston-like body in said cylinder.

11. Apparatus as recited in claim 9 wherein said piston-like body is formed so as to contact said cylinder in a sealing fashion substantially only along a circumferentially extending line intermediate the ends of said piston-like body.

12. Apparatus as recited in claim 11 wherein said piston-like body is a ball movable with a close radial fit in said cylinder.

13. Apparatus as recited in claim 9 wherein the density of said piston-like body is substantially the same as the density of the fluid.

14. Apparatus as recited in claim 9 and further comprising a compression spring located axially outside each end of said cylinder and coaxially therewith for preventing said piston-like body from moving out of said cylinder.

* * * * *